(12) United States Patent
Ishikawa et al.

(10) Patent No.: US 8,724,296 B2
(45) Date of Patent: May 13, 2014

(54) SOLID ELECTROLYTIC CAPACITOR AND FABRICATION METHOD THEREOF

(75) Inventors: Toru Ishikawa, Takatsuki (JP); Masayuki Fujita, Kyoto (JP); Takeshi Sano, Takatsuki (JP); Gaku Harada, Kawanishi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 763 days.

(21) Appl. No.: 12/767,953

(22) Filed: Apr. 27, 2010

(65) Prior Publication Data

US 2010/0271757 A1   Oct. 28, 2010

(30) Foreign Application Priority Data

Apr. 28, 2009 (JP) ................. 2009-109583
Apr. 8, 2010 (JP) ................. 2010-089199

(51) Int. Cl.
*H01G 9/02*   (2006.01)
(52) U.S. Cl.
USPC ........... 361/525; 361/523; 361/532; 361/502; 361/321.4; 361/321.5
(58) Field of Classification Search
USPC ........... 361/523, 525, 532, 311, 321.4, 321.5, 361/502
See application file for complete search history.

(56) References Cited

U.S. PATENT DOCUMENTS 6,430,033 B1 *   8/2002   Mitsui et al. ................. 361/525
7,800,887 B2 *   9/2010   Iida et al. ..................... 361/525
2005/0030678 A1   2/2005   Taketani et al.
2006/0181835 A1   8/2006   Murakami et al.
2008/0259529 A1   10/2008   Takatani et al.
2008/0304208 A1   12/2008   Murakami et al.
2011/0019339 A1   1/2011   Merker et al.

FOREIGN PATENT DOCUMENTS

| CN | 1545713 A | 11/2004 |
|---|---|---|
| JP | 06-112094 A | 4/1994 |
| JP | 10-321471 A | 12/1998 |
| JP | 2000-68152 A | 3/2000 |
| JP | 2001-307958 A | 11/2001 |
| JP | 2002-015956 A | 1/2002 |
| JP | 2008-147392 A | 6/2008 |
| WO | 2005/012599 A1 | 2/2005 |
| WO | 2009/047059 A1 | 4/2009 |

* cited by examiner

*Primary Examiner* — Robert J Hoffberg
*Assistant Examiner* — Hung Dang
(74) *Attorney, Agent, or Firm* — Marvin A. Motsenbocker; Mots Law, PLLC (57) ABSTRACT

To provide a solid electrolytic capacitor having a high capacitance and an excellent heat resistance. A solid electrolytic capacitor includes: an anode 2; a dielectric layer 3 provided on the surface of the anode 2; a first conductive polymer layer 4a provided on the dielectric layer 3; a second conductive polymer layer 4b provided on the first conductive polymer layer 4a; a third conductive polymer layer 4c provided on the second conductive polymer layer 4b; and a cathode layer provided on the third conductive polymer layer 4c, wherein the first conductive polymer layer 4a is made of a conductive polymer film formed by polymerizing pyrrole or a derivative thereof, the second conductive polymer layer 4b is made of a conductive polymer film formed by polymerizing thiophene or a derivative thereof, and the third conductive polymer layer 4c is made of a conductive polymer film formed by electropolymerizing pyrrole or a derivative thereof.

4 Claims, 2 Drawing Sheets

SOLID ELECTROLYTIC CAPACITOR AND FABRICATION METHOD THEREOF

BACKGROUND OF THE INVENTION

1. Field of the Invention

This invention relates to solid electrolytic capacitors using an anode made of a valve metal or an alloy thereof.

2. Description of Related Art

Solid electrolytic capacitors are generally produced by laying a dielectric layer, a solid electrolyte layer and a cathode layer one on another in this order on an anode made of a valve metal, such as tantalum, niobium, titanium or aluminum, or an alloy of such a valve metal. Such a solid electrolytic capacitor is used as incorporated into a power supply circuit of a CPU, a peripheral circuit thereof or the like in various mobile terminals, such as mobile personal computers and cellular phones, various image information devices, such as digital cameras, and other electronic devices.

Challenges for these electronic devices are to reduce the ESR (equivalent series resistance) of their solid electrolytic capacitors and to improve the heat resistance thereof, such as heat resistance to reflow soldering. Particularly, surface-mounted chip solid electrolytic capacitors, which are disposed near power supply circuits, conduct large amounts of electric current and therefore are affected by heat generated by peripheral devices and heat of resistance caused by the current flowing through the capacitors. In addition, these chip solid electrolytic capacitors are also required to have heat resistance to reflow soldering process because of elevated reflow temperature (peak temperature: 250° C. to 260° C.) due to use of lead-free solders.

Meanwhile, conductive polymers have been used as solid electrolyte layers in solid electrolytic capacitors. Known conductive polymers having heat resistance include polyaniline, polypyrrole and polythiophene. For example, the techniques disclosed in Published Japanese Patent Applications Nos. H10-321471 and 2008-147392 are known as conventional techniques that use as a solid electrolyte layer a combination of polythiophene having high heat resistance and polypyrrole excellent in rapid polymerization, such as electropolymerization.

In Published Japanese Patent Application No. H10-321471, a first conductive polymer layer is formed of polythiophene or a derivative thereof, and a second conductive polymer layer is formed of polypyrrole or a derivative thereof by electropolymerization. The document discloses that according to the above structure, the capacitance can be retained.

In Published Japanese Patent Application No. 2008-147392, a first conductive polymer layer is made of polythiophene and polypyrrole, and a second conductive polymer layer is made of polypyrrole, wherein the first conductive polymer layer is formed by forming a polythiophene film in islands and then forming polypyrrole to fill in between the islands. The document discloses that the ESR can be reduced because of high-conductivity polythiophene and reduction in contact resistance between the first and second conductive polymer layers due to polypyrroles contained in both the layers.

Published Japanese Patent Application No. 2002-15956 discloses that a precoat layer, a first conductive polymer layer and a second conductive polymer layer are formed on a dielectric layer, and that an example of a specific combination of conductive polymers is a combination precoat and first conductive polymer layers made polypyrrole and a second conductive polymer layer formed by adding carbon fibers to polythiophene. The document discloses that according to the above structure, the stress applied to the capacitor by heat stress due to soldering and the like can be reduced to thereby increase the heat resistance.

However, in the techniques disclosed in Published Japanese Patent Applications Nos. H10-321471 and 2008-147392, the formation of the conductive polymer layer containing polythiophene on the dielectric layer involves poor adhesion of the polythiophene layer to the dielectric layer, resulting in poor heat resistance of the capacitor.

In Published Japanese Patent Application No. 2002-15956, the second conductive polymer layer containing a mixture of polythiophene and carbon fibers is formed on polypyrrole forming the first conductive polymer layer. This structure has a problem in that the heat resistance cannot sufficiently be increased.

SUMMARY OF THE INVENTION

An object of the present invention is to provide a solid electrolytic capacitor excellent in heat resistance and a fabrication method thereof.

A solid electrolytic capacitor according to a first aspect of the invention is a solid electrolytic capacitor including an anode, a dielectric layer provided on the surface of the anode, a first conductive polymer layer provided on the dielectric layer, a second conductive polymer layer provided on the first conductive polymer layer, a third conductive polymer layer provided on the second conductive polymer layer, and a cathode layer provided on the third conductive polymer layer, wherein the first conductive polymer layer is made of a conductive polymer film formed by polymerizing pyrrole or a derivative thereof, the second conductive polymer layer is made of a conductive polymer film formed by polymerizing thiophene or a derivative thereof, and the third conductive polymer layer is made of a conductive polymer film formed by polymerizing pyrrole or a derivative thereof.

A solid electrolytic capacitor according to a second aspect of the invention is a solid electrolytic capacitor including an anode, a dielectric layer provided on the surface of the anode, a first conductive polymer layer provided on the dielectric layer, a second conductive polymer layer provided on the first conductive polymer layer, a third conductive polymer layer provided on the second conductive polymer layer, and a cathode layer provided on the third conductive polymer layer, wherein the first conductive polymer layer is made of a conductive polymer film formed by polymerizing pyrrole or a derivative thereof, the second conductive polymer layer is made of a conductive polymer film formed by polymerizing thiophene or a derivative thereof in the presence of an additive represented by the following general formula (1), and the third conductive polymer layer is made of a conductive polymer film formed by polymerizing pyrrole or a derivative thereof:

where R1 and R2 are independently selected from an alkyl group represented by $C_nH_{(2n+1)}$, an alkoxy group represented by $C_nH_{(2n+1)}O$, a carboxylic acid group, a hydroxy group, an amino group, a nitro group, an allyl group, and an aryl group;

and the benzene ring and the pyridine ring have one or a plurality of R1 groups attached thereto and one or a plurality of R2 groups attached thereto, respectively, the R1 groups being identical or different, the R2 groups being identical or different.

Hereinafter, in order to describe matters common to the first and second aspects of the invention, the term "present invention" is used to refer to these aspects.

In the present invention, the first conductive polymer layer, the second conductive polymer layer and the third conductive polymer layer are provided one on another in this order on the dielectric layer. The first conductive polymer layer provided on the dielectric layer is made of a conductive polymer film formed by polymerizing pyrrole or a derivative thereof. In the conductive polymer film formed by polymerizing pyrrole or a derivative thereof, the heterocycle in the film structure contains a nitrogen atom. The nitrogen atom can be coordinated to a metal atom. Therefore, the nitrogen atom can be coordinated to the metal in the valve metal oxide in the dielectric layer. Hence, the first conductive polymer layer made of polypyrrole or a derivative thereof has an excellent adhesion to the dielectric layer.

Furthermore, in the present invention, the second conductive polymer layer provided on the first conductive polymer layer is made of a conductive polymer film formed by polymerizing thiophene or a derivative thereof. Polythiophene or its derivative forms a polymer film having a higher electrical conductivity than that made of polypyrrole or its derivative. Therefore, if the conductive polymer film made of polythiophene or its derivative is provided, its higher heat resistance than polypyrrole and derivatives thereof can increase the heat resistance during the reflow soldering process.

In the present invention, the third conductive polymer layer formed by polymerizing pyrrole or a derivative thereof is provided on the second conductive polymer layer. Polypyrrole and its derivatives have lower oxidation potentials than polythiophene and its derivatives and therefore can form a conductive polymerized film with ease and at high film formation rate by electropolymerization.

On the other hand, polythiophene or its derivative serving as an underlayer in forming the third conductive polymer layer has a higher oxidation potential than polypyrrole and its derivatives. Therefore, in forming polypyrrole by electropolymerization, polypyrrole or its derivative can be formed at a low polymerization potential, whereby the third conductive polymer layer can be formed without damaging the second conductive polymer layer serving as an underlayer. Thus, the heat resistance can be increased.

In the present invention, the second conductive polymer layer can be made, for example, of polyethylenedioxythiophene.

In the second aspect of the invention, the second conductive polymer layer is made of a conductive polymer formed by polymerizing thiophene or a derivative thereof in the presence of an additive represented by the general formula (1) described above. By polymerization in the presence of the additive, the doping rate and orientation of the conductive polymer obtained can be improved and the crystallinity and density thereof can be increased. Thus, the electrical conductivity of the conductive polymer can be increased. Therefore, the capacitance can be increased, the ESR can be reduced, and the heat resistance can be further increased.

A method for fabricating a solid electrolytic capacitor according to the present invention is a method capable of fabricating the solid electrolytic capacitor according to the present invention, and more specifically a method for fabricating a solid electrolytic capacitor including an anode, a dielectric layer provided on the surface of the anode, a first conductive polymer layer provided on the dielectric layer, a second conductive polymer layer provided on the first conductive polymer layer, a third conductive polymer layer provided on the second conductive polymer layer, and a cathode layer provided on the third conductive polymer layer, the method including the steps of: forming the first conductive polymer layer by chemically polymerizing pyrrole or a derivative thereof; forming the second conductive polymer layer by chemically polymerizing thiophene or a derivative thereof; and forming the third conductive polymer layer by electropolymerizing pyrrole or a derivative thereof.

In the fabrication method according to the present invention, the first conductive polymer layer is formed by chemically polymerizing pyrrole or a derivative thereof, the second conductive polymer layer is formed by chemically polymerizing thiophene or a derivative thereof, and the third conductive polymer layer is formed by electropolymerizing pyrrole or a derivative thereof.

According to the fabrication method of the present invention, since the first conductive polymer layer is formed on the dielectric layer by chemically polymerizing pyrrole or a derivative thereof, the first conductive polymer layer can have a good adhesion and an excellent heat resistance.

Furthermore, since the second conductive polymer layer is formed on the first conductive polymer layer by chemically polymerizing thiophene or a derivative thereof, the second conductive polymer layer having an excellent electrical conductivity can be formed, thereby providing a solid electrolytic capacitor having an excellent heat resistance.

Moreover, according to the fabrication method of the present invention, since the third conductive polymer layer is formed by electropolymerizing pyrrole or a derivative thereof, the third conductive polymer layer can be formed, as described above, without damaging the second conductive polymer layer serving as an underlayer.

In addition, the use of electropolymerization enables the formation of the third conductive polymer layer at a high film formation rate, whereby a solid electrolytic capacitor can be efficiently fabricated.

Since the step of forming the second conductive polymer layer in the fabrication method of the present invention includes the step of chemically polymerizing thiophene or a derivative thereof in the presence of an additive represented by the above general formula (1), the solid electrolytic capacitor according to the second aspect of the invention can be fabricated.

EFFECTS OF THE INVENTION

According to the present invention, a solid electrolytic capacitor having an excellent heat resistance can be provided.

According to the fabrication method of the present invention, a solid electrolytic capacitor having an excellent heat resistance can be efficiently fabricated.

DETAILED DESCRIPTION OF PREFERRED EMBODIMENT

Hereinafter, the present invention will be described in detail with reference to an embodiment, but the present invention is not at all limited to the following embodiment and can be practiced with appropriate modification without departing from the spirit and scope of the invention.

Figure 1:
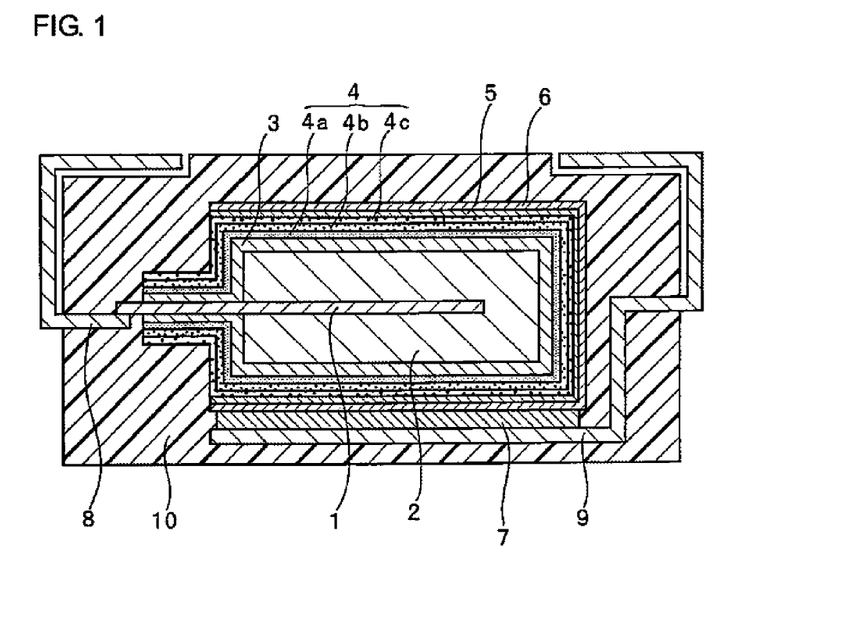
FIG. 1 is a schematic cross-sectional view showing solid electrolytic capacitor according to an embodiment of the present invention.

FIG. 1 is a schematic cross-sectional view showing a solid electrolytic capacitor according to an embodiment of the present invention.

As shown in FIG. 1, an anode lead 1 is embedded in an anode 2. The anode 2 is produced by forming a powder made of a valve metal or a valve metal-based alloy into a formed body and sintering the formed body. Therefore, the anode 2 is formed of a porous body. The porous body has a large number of fine pores formed to communicate between their insides and the outside, although they are not shown in FIG. 1. The anode 2 thus produced has, in this embodiment, the outer shape of an approximately rectangular box.

The valve metal forming the anode 2 is not particularly limited as long as it can be used for solid electrolytic capacitors. Examples of the valve metal include tantalum, niobium, titanium, aluminum, hafnium, zirconium, zinc, tungsten, bismuth and antimony. Among these the particularly preferred valve metals are tantalum, niobium, titanium and aluminum because their oxides have high dielectric constants and their source materials are easily available. Examples of valve metal-based alloys include alloys made of two or more valve metals, such as an alloy of tantalum and niobium, and alloys made of a valve metal and another kind of metal. If an alloy of a valve metal and another kind of metal is used, the proportion of the valve metal in the alloy is preferably 50 atomic percent or more.

The particle size of metal particles to be used to form the anode 2 can be 0.08 to 1 µm. To achieve particularly high capacitance, metal particles with a particle size of 0.2 to 0.5 µm can be preferably used.

A dielectric layer 3 is formed on the surface of the anode 2. The dielectric layer 3 is also formed on the surfaces of the pores in the anode 2. Note that FIG. 1 schematically shows the dielectric layer 3 formed on the outside surfaces of the anode 2 but does not show the above-described part of the dielectric layer formed on the surfaces of the pores in the porous body. The dielectric layer 3 can be formed by oxidizing the surface of the anode 2, such as by anodization.

The thickness of the dielectric layer 3 is preferably in the range of 10 to 500 nm, for example. If the thickness of the dielectric layer is greater than 500 nm, there may arise inconveniences including reduced capacitance and ease of delamination of the dielectric layer from the anode lead 1 and the anode 2. On the other hand, if the thickness of the dielectric layer 3 is smaller than 10 nm, the voltage resistance may be reduced and the leakage current may be increased.

A first conductive polymer layer 4a is formed on the surface of the dielectric layer 3. The first conductive polymer layer 4a is formed by polymerizing pyrrole or a derivative thereof. The first conductive polymer layer 4a is also formed on the part of the dielectric layer 3 lying on the surfaces of the pores in the anode 2. Note that FIG. 1 does not show the part of the first conductive polymer layer 4a lying over the surfaces of the pores in the anode 2.

A second conductive polymer layer 4b is formed on the first conductive polymer layer 4a. The second conductive polymer layer 4b is formed by polymerizing thiophene or a derivative thereof. The second conductive polymer layer 4b is also formed on the part of the first conductive polymer layer 4a lying over the surfaces of the pores in the anode 2. FIG. 1 does not show the part of the second conductive polymer layer 4b lying over the surfaces of the pores in the anode 2.

A third conductive polymer layer 4c is formed on the second conductive polymer layer 4b. The third conductive polymer layer 4c is formed by electropolymerizing pyrrole or a derivative thereof. The third conductive polymer layer 4c may also be formed on the part of the second conductive polymer layer 4b lying over the surfaces of the pores in the anode 2. FIG. 1 does not show the part of the third conductive polymer layer 4c lying over the surfaces of the pores in the anode 2.

The thickness of the first conductive polymer layer 4a is preferably in the range of 10 to 2000 nm. The thickness of the second conductive polymer layer 4b is preferably in the range of 10 to 2000 nm. The thickness of the third conductive polymer layer 4c is preferably in the range of 10 to 100 µm.

The first conductive polymer layer 4a is preferably formed by chemical polymerization. The second conductive polymer layer 4b can be formed by chemical polymerization or electropolymerization but is particularly preferably formed by chemical polymerization.

When the first conductive polymer layer 4a is formed by chemical polymerization, the anode 2 is immersed into a solution in which an oxidizing agent is dissolved, so that the oxidizing agent is previously applied on the underlayer. After the application of the oxidizing agent, the anode 2 is immersed into a solution in which a monomer is dissolved, or a vaporized monomer is brought into contact with the oxidizing agent-applied underlayer by allowing the anode 2 to stand in a monomer vapor atmosphere. Thus, a polymerization reaction is caused to form a polymer film.

The formation of the second conductive polymer layer 4b by chemical polymerization is performed like the formation of the first conductive polymer layer 4a: After the application of an oxidizing agent, the anode 2 is immersed into a solution in which a monomer is dissolved, or the anode 2 is allowed to stand in a monomer vapor atmosphere, thereby forming a polymer film.

Between the process for forming the first conductive polymer layer 4a and the process for forming the second conductive polymer layer 4b or between the process for forming the second conductive polymer layer 4b and the process for forming the third conductive polymer layer 4c, a conversion treatment may be performed again using a solution, such as the phosphoric acid aqueous solution used for anodization. By performing such a conversion treatment, the dielectric layer 3 deteriorated in the process for forming the first conductive polymer layer 4a or the second conductive polymer layer 4b can be repaired to reduce the leakage current.

The third conductive polymer layer 4c is formed by electropolymerization. The electropolymerization can be implemented by immersing the anode 2 having the first and second conductive polymer layers 4a and 4b formed thereon into a solution in which a monomer is dissolved, and by allowing the electric current to flow between the cathode disposed in the solution and the anode 2.

Figure 2:
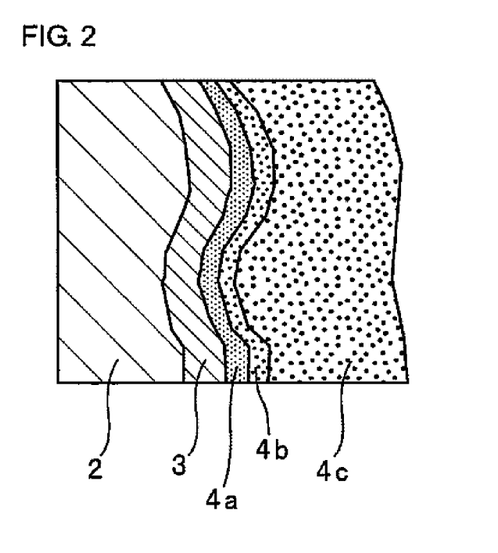
FIG. 2 is an enlarged cross-sectional view showing conductive polymer layers in the solid electrolytic capacitor shown in FIG. 1.

FIG. 2 is a cross-sectional view showing the first conductive polymer layer 4a, second conductive polymer layer 4b and third conductive polymer layer 4c that are formed one on another on the surface of the dielectric layer 3 of the anode 2. By making the first conductive polymer layer 4a to be provided on the dielectric layer 3 from polypyrrole or its derivative according to the present invention, the first conductive polymer layer 4a formed can have a good adhesion to the dielectric layer 3. The reason for this is that a nitrogen atom in the heterocycle contained in pyrrole can be easily coordinated to the metal of the dielectric layer 3 to form a conductive polymer film having a good adhesion to the dielectric layer 3.

On the first conductive polymer layer 4a is provided the second conductive polymer layer 4b. The second conductive polymer 4b is made of polythiophene or a derivative thereof. Polythiophene and its derivatives are more excellent in electrical conductivity and heat resistance than polypyrrole and its derivatives. Therefore, according to the present invention, a solid electrolytic capacitor having an excellent heat resistance can be provided.

On the second conductive polymer layer 4b is provide the third conductive polymer layer 4c. The third conductive polymer layer 4c is formed by electropolymerizing pyrrole or a derivative thereof. The second conductive polymer layer 4b serving as an underlayer for the third conductive polymer layer 4c is made of polythiophene or its derivative having a higher oxidation potential than polypyrrole or its derivative. Therefore, during formation of the third conductive polymer layer 4c by electropolymerization, the second conductive polymer layer 4b causes no oxidation reaction and the like. Thus, the third conductive polymer layer 4c can be formed without damaging the second conductive polymer layer 4b.

As shown in FIG. 1, a carbon layer 5 is formed on the third conductive polymer layer 4c, and a silver layer 6 is formed on the carbon layer 5. A cathode layer is composed of the carbon layer 5 and the silver layer 6. By forming the cathode layer in this manner, the third conductive polymer layer 4c is in contact with the cathode layer.

A cathode terminal 9 is connected to the surface of the silver layer 6 through a conductive adhesive layer 7. On the other hand, an anode terminal 8 is connected to the anode lead 1. A molded resin package 10 is formed so that the ends of the anode and cathode terminals 8 and 9 are extended to the outside.

In this embodiment, since the first conductive polymer layer 4a, the second conductive polymer layer 4b and the third conductive polymer layer 4c are formed one on another on the dielectric layer 3, a solid electrolytic capacitor having an excellent heat resistance can be provided.

Since, as shown in FIG. 2, the third conductive polymer layer 4c is generally formed by electropolymerization capable of rapid film formation, the third conductive polymer layer 4c can be formed with a greater thickness than the first and second conductive polymer layers 4a and 4b.

In the second aspect of the invention, in forming the second conductive polymer layer 4b, thiophene or a derivative thereof is polymerized in the presence of an additive represented by the general formula (1) described previously. The addition of the additive to the polymerizable liquid can provide the effect of inhibiting the polymerization reaction. Thus, the orientation of the conductive polymer film can be increased, and the crystallinity and density of the conductive polymer film can be increased.

The addition of the additive to the polymerizable liquid also provides a buffer effect of maintaining the pH of the polymerizable liquid steady. By adding the additive to the polymerizable liquid, the additive is dissociated into sulfonic acid anions and pyridine cations to produce a state of the polymerizable liquid in which a large amount of sulfonic acid anions exist. The sulfonic acid anions and hydrogen ions produced by the polymerization reaction exist as a sulfonic acid by equilibrium reaction and therefore can reduce the variation of pH of the polymerizable liquid. By reducing the variation of pH of the polymerizable liquid, the reaction rate can be kept constant to maintain the optimum conditions to the polymerization reaction. Therefore, the orientation and crystallinity of the conductive polymer and the density of the conductive polymer film can be maintained throughout the film, thereby increasing the electrical conductivity of the conductive polymer film.

As described above, the additive is dissociated, in the polymerizable liquid, into sulfonic acid anions as a dopant and pyridine cations as a basic substance. The basic substance acts on the oxidizing agent to reduce the polymerization rate. On the other hand, the dopant has the effect of promoting the doping and increasing the doping rate because of its presence in the polymerizable liquid. Thus, the doping rate of the dopant can be increased. This effect cannot be realized even if a salt containing a dopant is added after the polymerization process, and can be realized by polymerization in the presence of the additive.

The ratio of the additive to the oxidizing agent is preferably in the range of 0.1 to 5.0 mole of additive to 1 mole of oxidizing agent, and more preferably in the range of 0.5 to 3.0 mole. If the ratio of the additive to the oxidizing agent is in the range of 0.5 to 5.0 mole, the capacitance can be further enhanced, the ESR can be further reduced, and the heat resistance can be further increased.

Specific examples of the additive include pyridinium p-toluenesulfonate, pyridinium dodecylbenzenesulfonate, pyridinium mesitylenesulfonate, pyridinium naphthalenesulfonate, pyridinium butylnaphthalenesulfonate, pyridinium anthraquinonesulfonate, 2-aminoethanethiol p-toluenesulfonate, aminomalononitrile p-toluenesulfonate, phenylalanine benzyl ester p-toluenesulfonate, 2,6-dimethylpyridinium p-toluenesulfonate, 2,4,6-trimethylpyridinium p-toluenesulfonate, 2-chloro-1-methylpyridine p-toluenesulfonate, 2-fluoro-1-methylpyridine p-toluenesulfonate, pyridinium-3-nitrobenzenesulfonate, 1-cyclohexyl-3-(2-morpholinoethyl)carbodiimide metho-p-toluenesulfonate, glycine benzyl ester p-toluenesulfonate, hexyl 6-aminohexanoate p-toluenesulfonate, 3-alanine benzyl ester p-toluenesulfonate, D-alanine benzyl ester p-toluenesulfonate, D-leucine benzyl ester p-toluenesulfonate, D-valine benzyl ester p-toluenesulfonate, L-alanine benzyl ester p-toluenesulfonate, L-leucine benzyl ester p-toluenesulfonate, L-tyrosine benzyl ester p-toluenesulfonate, propionyl p-toluenesulfonate, tetramethylammonium p-toluenesulfonate, tetraethylammonium p-toluenesulfonate, tosufloxacin p-toluenesulfonate, imidazolium salts, pyrrolidinium salts, pyridinium salts, ammonium salts, phosphonium salts, and sulfonium salts.

EXAMPLES

Hereinafter, the present invention will be described in further detail with reference to specific examples, but the present invention is not limited to the following examples and can be practiced with appropriate modification without departing from the spirit and scope of the invention.

Example 1

Tantalum powder was used as a source material to knead it with a binder (a mixture of an acrylic resin and an organic solvent), thereby preparing a kneaded tantalum powder. The tantalum powder used was one having a CV value of 50000 ($\mu$FV/g), where the CV value is a product of the capacitance and electrolysis voltage of a tantalum sintered body on which an electrolytic oxide coating was formed.

The tantalum powder kneaded with the binder was formed, together with a tantalum metal wire of 0.5 mm diameter serving as an anode lead 1, into a formed body measuring 4.5 by 3.3 by 1.0 mm using a mold. The binder was removed from the formed body under reduced pressure, and the formed body was sintered at 1100° C., thereby producing an anode 2.

The anode 2 thus produced was immersed into approximately 0.1% by weight of phosphoric acid aqueous solution held at approximately 60° C., and anodized by application of approximately 10 V of voltage for 10 hours, thereby forming a dielectric layer 3 on the surface of the anode 2.

Next, the above anode 2 was immersed into a 20% by weight isopropyl alcohol solution of ferric p-toluenesulfonate (oxidizing agent) and then picked up. The anode 2 was then immersed into a solution of pyrrole (concentration: 95% or more), picked up and dried. By repeating the above process of immersing the anode 2 into the solution of oxidizing agent made of ferric p-toluenesulfonate and then into the solution of pyrrole five times, a first conductive polymer layer 4a made of polypyrrole was formed on the dielectric layer.

Next, the anode 2 was immersed into a 40% by weight butanol solution of ferric p-toluenesulfonate and then picked up. The anode 2 was then immersed into a solution of ethylenedioxythiophene (EDOT) (concentration: 95% or more), picked up and dried. By repeating the above process of immersing the anode 2 into the solution of oxidizing agent and then into the solution of EDOT five times, a second conductive polymer layer 4b made of polyethylenedioxythiophene (PEDOT) was formed on the first conductive polymer layer 4a.

The first conductive polymer layer 4a was formed to have a thickness of 100 nm, and the second conductive polymer layer 4b was formed to have a thickness of 20 nm.

A solution containing 1% by weight of pyrrole and 2% by weight of sodium dodecylbenzenesulfonate was prepared, and sulfuric acid was added to the solution until the pH reached 5 or less, thereby preparing a polymerizable liquid. The polymerizable liquid was put into a stainless vessel. The above anode subjected to the conversion treatment was immersed into the polymerizable liquid in the vessel. A stainless electrode was then pressed against the second conductive polymer layer of the anode to continuously touch the layer. A DC power supply was connected between the stainless vessel and the stainless electrode, with the stainless vessel as a negative electrode and the stainless electrode as a positive electrode. A constant current (0.1 mA per capacitor element) was passed between them for a predetermined period of time (10 hours), whereby a third conductive polymer layer 4c made of polypyrrole (with a thickness of 20 to 30 µm) was formed by electropolymerization on the second conductive polymer layer 4b.

After the formation of the third conductive polymer layer 4c, a carbon paste was applied on the third conductive polymer layer 4c and then dried to form a carbon layer 5. Subsequently, a silver paste was applied on the carbon layer 5 and then dried to form a silver layer 6. Next, a cathode terminal 9 was connected through a conductive adhesive layer to the surface of the silver layer 6, and an anode terminal 8 was connected to the anode lead 1, followed by encapsulation with a molded resin package 10. In this manner, a solid electrolytic capacitor A was produced.

Comparative Example 1

After a dielectric layer 3 was formed in the same manner as in Example 1, a first conductive polymer layer 4a made of PEDOT was formed on the dielectric layer 3 in the same manner as the second conductive polymer layer 4b in Example 1. Next, a second conductive polymer layer 4b made of polypyrrole was formed on the first conductive polymer layer 4a of PEDOT by chemical polymerization in the same manner as the first conductive polymer layer 4a in Example 1. Thereafter, a third conductive polymer layer 4c was formed in the same manner as in Example 1, and a solid electrolytic capacitor X was then produced in the same manner as in Example 1.

Comparative Example 2

A second conductive polymer layer 4b was also formed of polypyrrole in the same manner as the first conductive polymer layer 4a in Example 1. Specifically, first and second conductive polymer layers 4a and 4b made of polypyrrole were formed by chemical polymerization by repeating the process of immersion into the solution of oxidizing agent and then into the solution of pyrrole ten times in total, and thereafter a solid electrolytic capacitor Y was produced in the same manner as in Example 1.

Comparative Example 3

A first conductive polymer layer 4a made of PEDOT was formed on a dielectric layer 3 in the same manner as the second conductive polymer layer 4b in Example 1. Thereafter, a solid electrolytic capacitor Z was produced in the same manner as in Example 1 except the above. In this comparative example, the first and second conductive polymer layers 4a and 4b were formed of PEDOT by chemical polymerization. Specifically, the first and second conductive polymer layers 4a and 4b were formed by repeating the process of immersion into the solution of oxidizing agent and then into the solution of EDOT in Example 1 ten times.

Comparative Example 4

After a dielectric layer 3 and a first conductive polymer layer 4a made of polypyrrole (with a thickness of 100 nm) were formed in the same manner as in Example 1, a second conductive polymer layer 4b made of polypyrrole (with a thickness of 20 to 30 µm) was formed in the same manner as the third conductive polymer layer 4c in Example 1.

Next, a third conductive polymer layer 4c made of PEDOT (with a thickness of 20 nm) was formed in the same manner as the second conductive polymer layer 4b in Example 1.

After the formation of the third conductive polymer layer 4c, a solid electrolytic capacitor W was produced in the same manner as in Example 1.

[Measurements of Capacitance and ESR Just after Capacitor Production]

Capacitors of Example 1 and Comparative Examples 1 to 4 were measured in terms of capacitance and ESR just after the production. One hundred sample capacitors were produced for each of the solid electrolytic capacitors of Example 1 and Comparative Examples 1 to 4. These one hundred samples were each measured in terms of capacitance and ESR, and the average value of the measured capacitances (average capacitance) and the average value of the measured ESRs (average ESR) were evaluated. The capacitances were measured at a frequency of 120 Hz with an LCR meter, and the ESRs were measured at a frequency of 100 kHz with the LCR meter. The measurement results are shown in Table 1.

TABLE 1

| | Capacitor | First Conductive Polymer Layer | Second Conductive Polymer Layer | Third Conductive Polymer Layer | Average Capacitance (μF) | Average ESR (mΩ) |
|---|---|---|---|---|---|---|
| Ex. 1 | Capacitor A | Polypyrrole | PEDOT | Polypyrrole | 350 | 10.5 |
| Comp. Ex. 1 | Capacitor X | PEDOT | Polypyrrole | Polypyrrole | 340 | 10.6 |
| Comp. Ex. 2 | Capacitor Y | Polypyrrole | Polypyrrole | Polypyrrole | 349 | 13.8 |
| Comp. Ex. 3 | Capacitor Z | PEDOT | PEDOT | Polypyrrole | 227 | 10.1 |
| Comp. Ex. 4 | Capacitor W | Polypyrrole | Polypyrrole | PEDOT | 335 | 13.5 |

[Measurements of Capacitance and ESR after Reflow Process]

Each of the capacitors of Example 1 and Comparative Examples 1 to 4 was subjected to a reflow soldering process twice at a peak temperature of 260° C. Each sample capacitor was measured in terms of capacitance and ESR in the same manner as above 24 hours after the final reflow soldering process. The measurement results are shown in Table 2.

Table 2 also shows the average capacitances and average ESRs just after the capacitor production. In addition, Table 2 also shows the capacitance retentions and ESR variations obtained from the capacitances and ESRs just after the production and those after the reflow soldering process.

TABLE 2

| | | Just After Production | | After Reflow Process | | | |
|---|---|---|---|---|---|---|---|
| | Capacitor | Average Capacitance (μF) | Average ESR (mΩ) | Average Capacitance (μF) | Capacitance Retention (%) | Average ESR (mΩ) | ESR Variation (mΩ) |
| Ex. 1 | Capacitor A | 350 | 10.5 | 345 | 99 | 10.6 | +0.1 |
| Comp. Ex. 1 | Capacitor X | 340 | 10.6 | 318 | 94 | 11.5 | +0.9 |
| Comp. Ex. 2 | Capacitor Y | 349 | 13.8 | 314 | 90 | 20.1 | +6.3 |
| Comp. Ex. 3 | Capacitor Z | 227 | 10.1 | 195 | 86 | 15.3 | +5.2 |
| Comp. Ex. 4 | Capacitor W | 335 | 13.5 | 312 | 93 | 19.8 | +6.3 |

As is obvious from Table 1, the capacitor A of Example and the capacitor Y of Comparative Example 2 had approximately equal capacitances, the capacitor X of Comparative Example 1 had a slightly lower capacitance, and the capacitor Z of Comparative Example 3 had a still lower capacitance. It can be assumed that the reason for this results is that because the PEDOT film formed as the first conductive polymer layer 4a had a poor adhesion to the dielectric layer 3, its coverage over the dielectric layer 3 was reduced.

To demonstrate the above, after the formation of PEDOT films in Example 1 and Comparative Example 1, these films were measured in terms of electronic state of sulfur atoms (S) and signal intensity distribution thereof on the film surface by ultraviolet photoelectron spectroscopy (UPS). For Example 1, the sample after the formation of the second conductive polymer layer 4b was measured. For Comparative Example 1, the sample after the formation of the first conductive polymer layer 4a was measured.

As a result, it was confirmed that for Example 1, sulfur atoms derived from thiophene were detected over the entire measured region, and that for Comparative Example 1, the distribution of sulfur atoms derived from thiophene was uneven and high sulfur density areas were dispersed in islands. Therefore, it can be proved that if a PEDOT film is formed on a first conductive polymer layer made of polypyrrole as in Example 1, the PEDOT film can be evenly formed, but if a PEDOT film is formed on a dielectric layer 3, the PEDOT film can be unevenly formed in a pattern dispersed in islands.

As shown in Table 1, the capacitor A of Example 1 in which a PEDOT film was formed as a second conductive polymer layer 4b was reduced in average ESR as compared to the capacitor Y of Comparative Example 2 in which a polypyrrole film was formed as a second conductive polymer layer 4b. It can be assumed that the reason for the reduced ESR is that a PEDOT film having an excellent electrical conductivity was formed as a second conductive polymer layer 4b.

As is obvious from the results on the capacitance retentions and ESR variations after the reflow soldering process shown in Table 2, the capacitor A of Example 1 according to the present invention is more excellent in heat resistance than the capacitors X, Y, Z and W of Comparative Examples 1 to 4.

Comparison between the results of the capacitor A of Example 1 and the capacitor X of Comparative Example 1 shown in Table 2 shows that both the capacitors had approximately equal ESR values just after the production, but that the capacitor X of Comparative Example 1 after the reflow soldering process increased the ESR and reduced the capacitance. Comparison between the results of the capacitor A of Example 1 and the capacitor Y of Comparative Example 2 shown in Table 2 shows that the capacitor Y of Comparative Example 2 after the reflow soldering process significantly reduced the capacitance and significantly increased the ESR. It can be assumed that the reason for these phenomena is that for Comparative Examples 1 and 2, the polypyrrole film serving as a third conductive polymer layer was formed by electropolymerization on the polypyrrole film serving as a second conductive polymer layer. More specifically, when polypyrrole and PEDOT are measured in terms of redox potential by cyclic voltammetry (CV), polypyrrole exhibits an oxidation potential of approximately 1.0 V (versus Ag/AgCl) in an aqueous solution, and PEDOT exhibits an oxidation potential of approximately 4.0 V (versus Ag/AgCl) in an acetonitrile solution. Therefore, it can be assumed that the reason for the above phenomena is that during formation of polypyrrole by electropolymerization, oxidation progressed in the polypyrrole film serving as a second conductive polymer layer 4b that is an underlayer, thereby giving damage to the second conductive polymer layer 4b and resulting in reduced capacitance and heat resistance. On the other hand, for Example 1, the PEDOT film with a high oxidation potential was formed as a second conductive polymer layer 4b. Therefore, although a polypyrrole film with a relatively low oxidation potential was formed on the second conductive polymer layer 4b by electropolymerization, the second conductive polymer layer 4b serving as an underlayer was not damaged. Hence, the capacitor A of Example 1 could increase the heat resistance.

It can be assumed that since Comparative Example 3 had the first and second conductive polymer layers 4a and 4b both formed of PEDOT film, the adhesion of the PEDOT film to the dielectric layer 3 was poor, and therefore the capacitance was lower than those of Example 1 and Comparative Examples 1 and 2. Furthermore, the poor adhesion to the dielectric layer 3 increased the ESR variation after the reflow process as shown in Table 2.

For Comparative Example 4, since the second conductive polymer layer 4b made of polypyrrole was formed on the first conductive polymer layer 4a made of polypyrrole, the first conductive polymer layer 4a serving as an underlayer was damaged as described above. In addition, the third conductive polymer layer 4c made of PEDOT had a poor adhesion to the carbon layer 5. Therefore, the ESR was increased and the capacitance was reduced. Furthermore, since the first conductive polymer layer 4a was damaged and the adhesion of the third conductive polymer layer 4c to the carbon layer 5 was reduced, the heat resistance was reduced.

Example 2

After the formation of a first conductive polymer layer 4a in the same manner as in Example 1, to a 40% by weight butanol solution of ferric p-toluenesulfonate was added 0.1 mole equivalent of pyridinium p-toluenesulfonate per mole equivalent of ferric p-toluenesulfonate, thereby preparing an oxidizing liquid. The anode 2 was immersed into the oxidizing agent liquid, then picked up from the liquid, then put into a vessel filled with 3,4-ethylenedioxythiophene (EDOT) vapor, then picked up from the vessel, and then dried. Through these processes, a second conductive polymer layer 4b made of polyethylenedioxythiophene (PEDOT) was formed on the first conductive polymer layer 4a by vapor phase polymerization.

Thereafter, a third conductive polymer layer 4c was formed in the same manner as in Example 1, and a solid electrolytic capacitor B was produced in the same manner as in Example 1.

Examples 3 to 7

Solid electrolytic capacitors C to G were produced in the same manner as in Example 2 except that the ratios of pyridinium p-toluenesulfonate (PPTS) to ferric p-toluenesulfonate (Fe.pTS) were as follows:

(Fe.pTS):(PPTS)

Example 3 1.0:0.5

Example 4 1.0:0.8

Example 5 1.0:1.0

Example 6 1.0:2.0

Example 7 1.0:5.0

[Measurements of Capacitance and ESR Just after Capacitor Production and after Reflow Process]

Capacitors of Examples 2 to 7 were measured in terms of capacitance and ESR just after the production and after the reflow soldering process in the same manner as described above. The measurement results are shown in Tables 3 and 4.

TABLE 3

| | Capacitor | First Conductive Polymer Layer | Second Conductive Polymer Layer Oxidant:Additive | Second Conductive Polymer Layer Polymer | Third Conductive Polymer Layer | Average Capacitance (µF) | Average ESR (mΩ) |
|---|---|---|---|---|---|---|---|
| Ex. 2 | Capacitor B | Polypyrrole | 1.0:0.1 | PEDOT | Polypyrrole | 355 | 9.5 |
| Ex. 3 | Capacitor C | Polypyrrole | 1.0:0.5 | PEDOT | Polypyrrole | 365 | 9.2 |
| Ex. 4 | Capacitor D | Polypyrrole | 1.0:0.8 | PEDOT | Polypyrrole | 377 | 8.9 |
| Ex. 5 | Capacitor E | Polypyrrole | 1.0:1.0 | PEDOT | Polypyrrole | 391 | 8.7 |
| Ex. 6 | Capacitor F | Polypyrrole | 1.0:2.0 | PEDOT | Polypyrrole | 372 | 9.0 |
| Ex. 7 | Capacitor G | Polypyrrole | 1.0:5.0 | PEDOT | Polypyrrole | 354 | 10.1 |

TABLE 4

| | Capacitor | Just After Production Average Capacitance (µF) | Just After Production Average ESR (mΩ) | After Reflow Process Average Capacitance (µF) | After Reflow Process Capacitance Retention (%) | After Reflow Process Average ESR (mΩ) | After Reflow Process ESR Variation (mΩ) |
|---|---|---|---|---|---|---|---|
| Ex. 2 | Capacitor B | 355 | 9.5 | 348 | 98 | 9.7 | +0.2 |
| Ex. 3 | Capacitor C | 365 | 9.2 | 357 | 98 | 9.3 | +0.1 |
| Ex. 4 | Capacitor D | 377 | 8.9 | 368 | 98 | 8.9 | +0.0 |
| Ex. 5 | Capacitor E | 391 | 8.7 | 383 | 98 | 8.7 | +0.0 |
| Ex. 6 | Capacitor F | 372 | 9.0 | 364 | 98 | 9.2 | +0.2 |
| Ex. 7 | Capacitor G | 354 | 10.1 | 343 | 97 | 10.4 | +0.3 |

Figure 3:
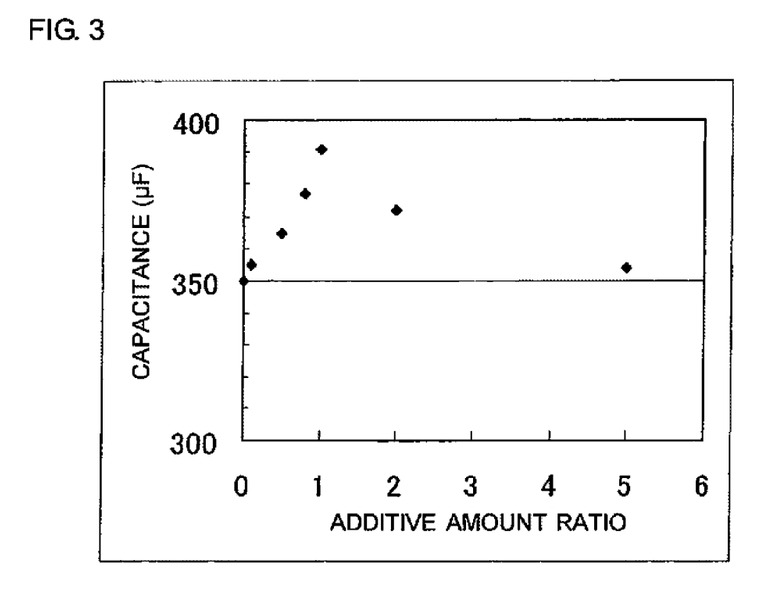
FIG. 3 is a graph showing the relationship between additive amount ratio and capacitance in examples according to a second aspect of the invention.

FIG. 3 shows the relationship between the ratio of pyridinium p-toluenesulfonate to ferric p-toluenesulfonate (Additive Amount Ratio) and capacitance. Furthermore, FIG. 4 shows the relationship between additive amount ratio and ESR.

As can be seen from comparison between Example 1 shown in Table 1 and Examples 2 to 7 shown in Table 4, when a second conductive polymer layer 4b is formed by vapor phase polymerization in the presence of pyridinium p-toluenesulfonate serving as an additive according to the second aspect of the invention, the capacitance can be increased and the ESR can be reduced. In addition, the comparison shows that the capacitors of Examples 2 to 7 after the reflow process had high capacitance retentions, small ESR variations and more excellent heat resistance.

Figure 4:
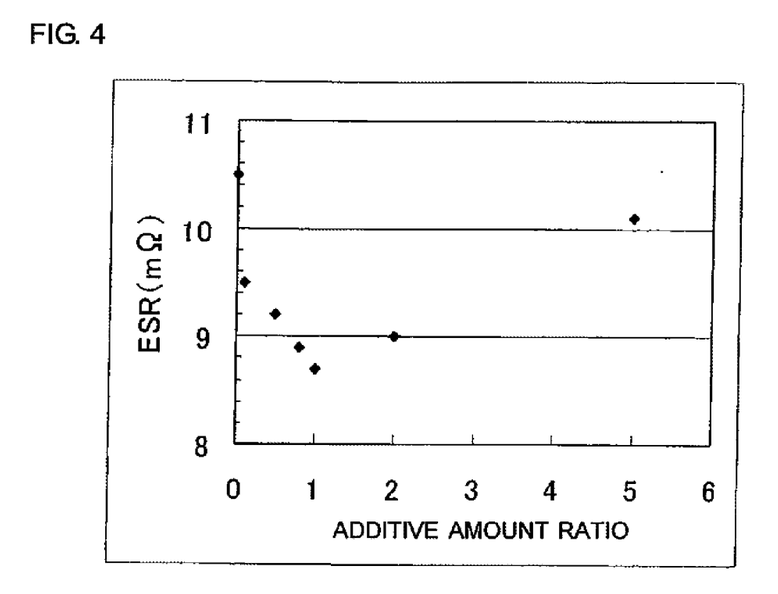
FIG. 4 is a graph showing the relationship between additive amount ratio and ESR in the examples according to the second aspect of the invention.

As seen from the results shown in FIGS. 3 and 4, the ratio of the additive to the oxidizing agent is preferably in the range of 0.1 to 5.0 mole of additive to 1 mole of oxidizing agent, and more preferably in the range of 0.5 to 3.0 mole.

As seen from the description so far, the solid electrolytic capacitor according to the present invention is a solid electrolytic capacitor excellent in heat resistance. Therefore, the solid electrolytic capacitor according to the present invention is suitable, for example, as a surface-mounted solid electrolytic capacitor to be soldered to a substrate by reflow soldering process.

What is claimed is:

1. A solid electrolytic capacitor including an anode, a dielectric layer provided on the surface of the anode, a first conductive polymer layer provided on the dielectric layer, a second conductive polymer layer provided on the first conductive polymer layer, a third conductive polymer layer provided on the second conductive polymer layer, and a cathode layer provided on the third conductive polymer layer, wherein the first conductive polymer layer is made of a conductive polymer film of polypyrrole or a conductive polymer film of a derivative of pyrrole, the second conductive polymer layer is made of a conductive polymer film of polythiophene or a conductive polymer film of a derivative of thiophene, and the third conductive polymer layer is made of a conductive polymer film of polypyrrole or a conductive polymer film of a derivative of pyrrole, wherein the first conductive polymer layer is provided directly on the dielectric layer.

2. The solid electrolytic capacitor according to claim 1, wherein the second conductive polymer layer is made of polyethylenedioxythiophene.

3. The solid electrolytic capacitor according to claim 1, wherein, in a cross-sectional view of the solid electrolytic capacitor, the third conductive polymer layer surrounds an entirety of the second conductive polymer layer, and the second conductive polymer layer surrounds an entirety of the first conductive polymer layer.

4. The solid electrolytic capacitor according to claim 1, wherein the first, second and third polymer layers have substantially the same curvature of respective top and bottom surfaces thereof.

* * * * *